United States Patent
Oki

(10) Patent No.: US 11,250,558 B2
(45) Date of Patent: Feb. 15, 2022

(54) IMAGE INSPECTING APPARATUS, COMPUTER-READABLE RECORDING MEDIUM STORING A PROGRAM, IMAGE PROCESSING APPARATUS, AND IMAGE FORMING APPARATUS

(71) Applicant: KONICA MINOLTA, INC., Tokyo (JP)

(72) Inventor: Makoto Oki, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 46 days.

(21) Appl. No.: 16/745,619

(22) Filed: Jan. 17, 2020

(65) Prior Publication Data

US 2020/0234423 A1 Jul. 23, 2020

(30) Foreign Application Priority Data

Jan. 21, 2019 (JP) .............................. JP2019-007496

(51) Int. Cl.
*G06T 7/00* (2017.01)

(52) U.S. Cl.
CPC .... *G06T 7/001* (2013.01); *G06T 2207/20021* (2013.01); *G06T 2207/30144* (2013.01)

(58) Field of Classification Search
CPC . G06T 2207/10024; G06T 2207/30144; G06T 2207/20224; G06T 7/001; G06T 2207/20021

See application file for complete search history.

(56) References Cited

U.S. PATENT DOCUMENTS

| 2013/0148987 A1* | 6/2013 | Arakawa | G06K 9/3216 |
| | | | 399/15 |
| 2013/0182002 A1* | 7/2013 | Macciola | H04N 1/387 |
| | | | 345/589 |

(Continued)

FOREIGN PATENT DOCUMENTS

| CN | 104982026 A | 10/2015 |
| JP | 2013224833 A | 10/2013 |
| JP | 6196517 B2 * | 9/2017 |

OTHER PUBLICATIONS

Ferreira, Anselmo, et al. "Laser printer attribution: Exploring new features and beyond." Forensic science international 247 (2015): 105-125. (Year: 2015).*

(Continued)

*Primary Examiner* — Pinalben Patel
(74) *Attorney, Agent, or Firm* — Buchanan Ingersoll & Rooney PC

(57) ABSTRACT

An inspection image is assumed to contain many abnormalities when a reference image and an inspection image are misaligned. It has been impossible to determine whether the abnormalities are attributed to the inspection image. An image inspecting apparatus includes: a print alignment portion that aligns a print position of a reference image with a print position of an inspection image; an abnormality detector that detects an abnormality in the inspection image based on a difference between the reference image and the inspection image after print positions are aligned; and a print alignment result evaluator that evaluates a print position alignment result from aligning a print position of the reference image with a print position of the inspection image including an abnormality detected based on dispersion of the difference included in an evaluation region around an edge calculated from a printout image included in the reference image.

12 Claims, 11 Drawing Sheets

(56) References Cited

U.S. PATENT DOCUMENTS

| | | | |
|---|---|---|---|
| 2015/0220809 A1 | 8/2015 | Kawabata et al. | |
| 2015/0221077 A1* | 8/2015 | Kawabata | G06T 7/337 382/141 |
| 2015/0356717 A1* | 12/2015 | Madden | H04N 1/00005 358/1.6 |
| 2016/0180198 A1* | 6/2016 | Davis | G06T 3/00 382/159 |
| 2019/0025229 A1* | 1/2019 | Brauer | G01N 21/9503 |

OTHER PUBLICATIONS

First Office Action dated Sep. 7, 2021, by the Chinese Patent Office in corresponding Chinese Patent Application No. 202010052284.4, and an English Translation of the Office Action. (26 pages).

* cited by examiner

IMAGE INSPECTING APPARATUS, COMPUTER-READABLE RECORDING MEDIUM STORING A PROGRAM, IMAGE PROCESSING APPARATUS, AND IMAGE FORMING APPARATUS

CROSS-REFERENCE TO RELATED APPLICATIONS

The entire disclosure of Japanese Patent Application No. 2019-7496, filed on Jan. 21, 2019, is incorporated herein by reference in its entirety.

BACKGROUND

Technological Field

The present invention relates to an image inspecting apparatus, a computer-readable recording medium storing a program, an image processing apparatus, and an image forming apparatus.

Description of the Related Art

A conventional image inspection detects an image abnormality by reading an image printed on paper and analyzing the read image. This image inspection detects as an image abnormality such as stain or color deviation occurring on the actual printout image when a difference between an original criterial printout image and an actually detected printout image is larger than or equal to a specified value. When an image is printed on many pages, the image may be printed at a position deviated from the original position. Accurate image alignment is critical. It has been necessary to reliably identify a misaligned image.

As described in Patent Literature 1, for example, a range to determine items to be good can be expanded for a contour where pixel values greatly vary.

CITATION LIST

Patent Literature

Patent Literature 1: JP 2013-224833 A

SUMMARY

Conventionally, a reference image is printed at a correct position on paper. An inspection image is used to inspect the alignment. A difference is found between the inspection image and the reference image. The standard deviation to express dispersion of the differences is used to determine whether the inspection image is correctly aligned. The standard deviation decreases if the reference image and the inspection image match. The standard deviation increases if the reference image and the inspection image mismatch. The standard deviation tends to increase when characters are to be aligned. The standard deviation tends to decrease when images other than characters are to be aligned. Misalignment easily disperses differences between the reference image and the inspection image. The inspection image is assumed to contain many abnormalities. In such a case, an operator to inspect images cannot correctly determine whether an abnormality is caused by stain, for example, detected from the inspection image or results from the misalignment.

The technology disclosed in patent literature 1 presupposes that two images are aligned. By using this technology alone, an operator cannot determine whether two images are correctly aligned.

The present invention has been made in consideration of the foregoing. It is an object of the invention to accurately evaluate the results of aligning the printout of an inspection image based on a reference image.

To embody at least one of the above-described objects, according to an aspect of the present invention, an image inspecting apparatus reflecting one aspect of the present invention includes: a reader that reads an image formed by an image forming apparatus on a recording material and generates an inspection image; a print alignment portion that aligns a print position of a reference image used as a reference for a good-item inspection on an image formed on a recording material with a print position of an inspection image; an abnormality detector that detects an abnormality in the inspection image based on a difference between the reference image and the inspection image after print positions are aligned; and a print alignment result evaluator that evaluates a print position alignment result from aligning a print position of the reference image with a print position of the inspection image including an abnormality detected based on dispersion of the difference included in an evaluation region around an edge calculated from a printout image included in the reference image. The difference is calculated from the inspection image including an abnormality detected.

The above-described image inspecting apparatus represents one mode of the present invention. A computer-readable recording medium storing a program, an image processing apparatus, and an image forming apparatus reflecting one aspect of the present invention are also configured similarly to the above-described image inspecting apparatus.

Description of the embodiments below will clarify issues and configuration other than those mentioned above.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
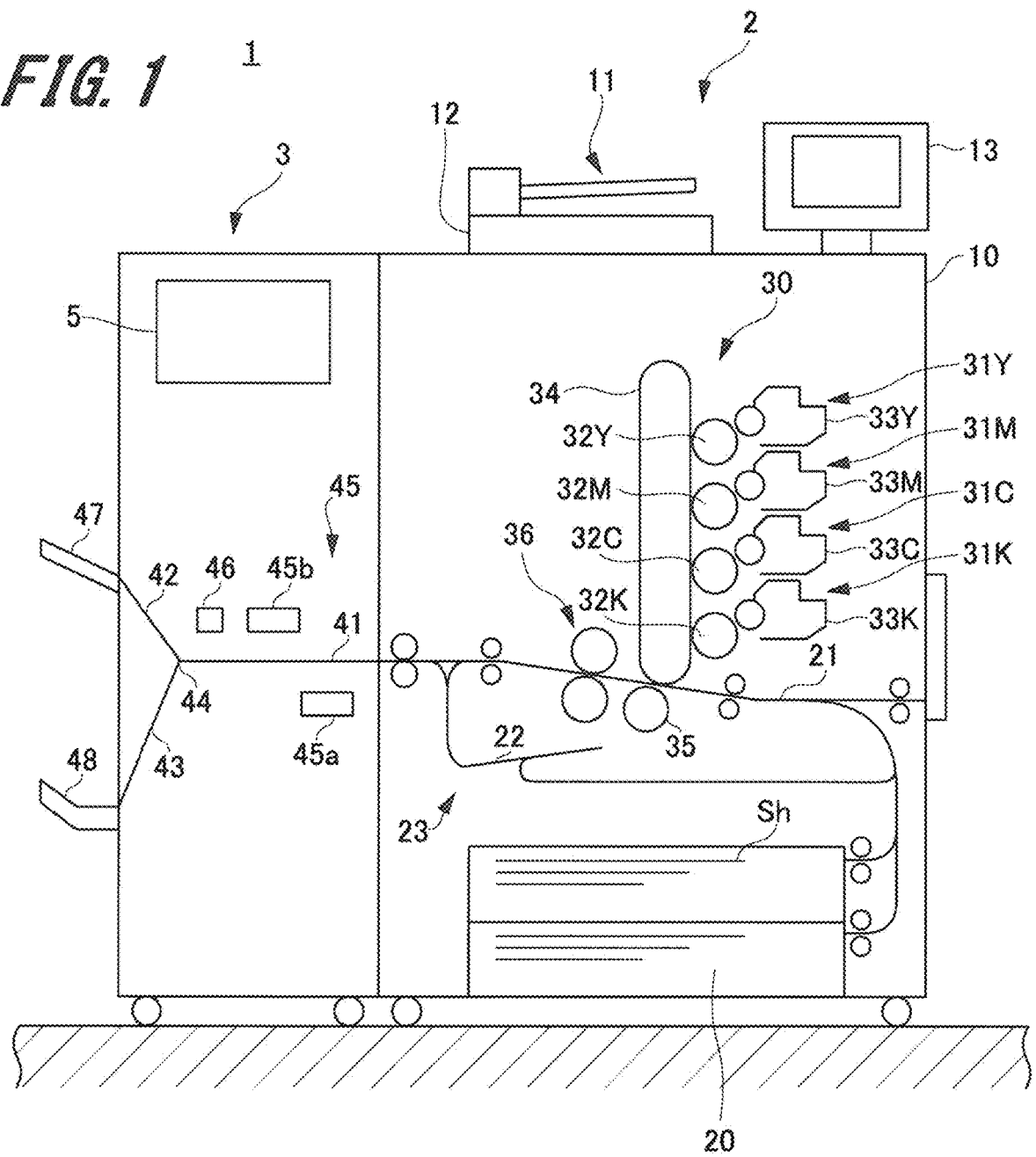
FIG. 1 is a schematic configuration diagram illustrating an image forming system according to a first embodiment of the present invention.

The description below explains the embodiments of the present invention with reference to the accompanying drawings. However, the scope of the invention is not limited to the disclosed embodiments. The present specification and drawings use the same reference numerals or symbols for constituent elements having substantially the same functions or configurations to omit a duplicate description.

First Embodiment

Configuration of the Image Forming System

With reference to FIG. 1, the description below explains an example configuration of the image forming system according to the first embodiment of the present invention.

FIG. 1 is a schematic configuration diagram illustrating an image forming system 1 according to the first embodiment of the present invention. FIG. 1 illustrates the elements and associated elements considered to be necessary for the description of the present invention. The image forming system according to the present invention is not limited to the example illustrated in FIG. 1.

The image forming system 1 includes an image forming apparatus 2 and an image inspecting apparatus 3. The image forming apparatus 2 provides an example of the image forming apparatus that forms images on paper based on the electrophotographic system to form images by using static electricity. The image forming apparatus 2 forms color images on paper based on the tandem type that overlays toner images in four colors such as yellow (Y), magenta (M), cyan (C), and black (K). The image forming apparatus 2 mainly connects with a PC (Personal Computer) 70 (see FIG. 2 to be described later) manipulated by an operator via an unshown LAN (Local Area Network). The PC 70 supplies a job to the image forming apparatus 2 via the LAN. The image forming apparatus 2 performs various processes such as an image forming process based on the supplied job.

First, an example configuration of the image forming apparatus 2 will be described.

The image forming apparatus 2 includes an image input portion 11 equipped with an auto document feeder (ADF) 12 and a manipulation display portion 13. The image forming apparatus 2 also includes a printer portion 10 equipped with a sheet feed tray 20 and an image forming portion 30.

The image input portion 11 optically reads an image from a document placed on a platen of the ADF 12 and applies A/D conversion to the read image to generate image data.

The image input portion 11 can also read an image from a document placed on the platen glass.

The manipulation display portion 13 is comprised of a display portion mainly including a liquid crystal panel and a manipulation portion mainly including a touch sensor. The display portion and the manipulation portion are integrally formed as a touch panel, for example. The manipulation display portion 13 generates a manipulation signal representing the contents of manipulation entered by an operator from the manipulation portion and supplies the manipulation signal to a controller 50 (see FIG. 2 to be described later). Based on a display signal supplied from the controller 50, the manipulation display portion 13 allows the display portion to mainly display the manipulation contents or setup information specified by the operator. The manipulation portion may be provided as a mouse or a tablet and may be configured apart from the display portion.

The sheet feed tray 20 provides a container that contains sheet Sh where the image forming portion 30 forms images. The sheet feed tray 20 contains sheets of different sheet types or basis weights. Sheet Sh represents an example of recording materials. The image forming apparatus 2 can form images on a plastic sheet as an example of recording materials. The present embodiment provides an example of equipping two sheet feed trays 20. However, the number of sheet feed trays 20 may be one or three or more.

The image forming apparatus 2 includes a transport path 21 that transports sheet Sh supplied from the sheet feed tray 20 to the image inspecting apparatus 3. The transport path 21 includes a plurality of transport rollers to transport sheet Sh.

Downstream of a fixing portion 36, the transport path 21 extends to connect with a transport path 41 of the image inspecting apparatus 3. The transport path 21 branches downstream of the fixing portion 36. One end of the branched transport path 21 connects with a reversing transport path 22 that joins the transport path 21 upstream of the printer portion 10. The reversing transport path 22 includes a reversing portion 23 that reverses sheet Sh. Sheet Sh, after reversed by the reversing portion 23, passes through the reversing transport path 22 and returns upstream of the transport path 21. When sheet Sh is reversed due to a path change, sheet Sh may return to the transport path 21 downstream of the fixing portion 36 and then transported to the image inspecting apparatus 3.

The image forming portion 30 includes four image forming units 31Y, 31M, 31C, and 31K to form toner images in colors Y, M, C, and K and forms images on sheet Sh. The image forming units 31Y, 31M, 31C, and 31K each include unshown chargers, unshown exposers, photosensitive drums 32Y, 32M, 32C, and 32K as image carriers, and developers 33Y, 33M, 33C, and 33K.

The developers 33Y, 33M, 33C, and 33K radiate the light corresponding to an image onto surfaces (outer peripheries) of the photosensitive drums 32Y, 32M, 32C, and 32K to form electrostatic latent images on the peripheries of the photosensitive drums. The developers 33Y, 33M, 33C, and 33K apply the toner to the electrostatic latent image to form toner images on the photosensitive drums 32Y, 32M, 32C, and 32K.

The image forming portion 30 includes an interim transfer belt 34, a secondary transfer portion 35, and the fixing portion 36. The interim transfer belt 34 provides a belt onto which images formed on the photosensitive drums 32Y, 32M, 32C, and 32K are primarily transferred. The secondary transfer portion 35 provides a roller that secondarily transfers the toner images onto sheet Sh transported from the transport path 21 after the toner images in the respective colors are primarily transferred onto the interim transfer belt 34.

The fixing portion 36 is placed downstream in the paper transportation direction of the secondary transfer portion 35 and performs a fixing process on sheet Sh that is supplied from the image forming portion 30 and contains a color toner image formed thereon. The fixing portion 36 heats and pressurizes the transported sheet Sh to fix the image transferred by the image forming portion 30 onto the surface of sheet Sh. Sheet Sh containing the image fixed by the fixing portion 36 passes through the transport path 21 and is transported to the image inspecting apparatus 3. Alternatively, sheet Sh passes through the reversing transport path 22 to be reversed on both sides by the reversing portion 23 and is then returned to the transport path 21 upstream in the printer portion 10. The printer portion 10 forms an image on the reverse side of sheet Sh after reversed. The fixing portion 36 performs the fixing process on sheet Sh that is then transported to the image inspecting apparatus 3.

The description below explains an example configuration of the image inspecting apparatus 3.

The image inspecting apparatus 3 inspects whether an image is formed (printed) at the correct position on sheet Sh transported from the image forming apparatus 2. An image processing apparatus 5 attached to the image inspecting apparatus 3 performs a process on images formed on sheet Sh, namely the image inspection by the image inspecting apparatus 3.

The image inspecting apparatus 3 includes transport paths 41, 42, and 43 to transport sheet Sh transported from the image forming apparatus 2, a changer 44, readers 45a and 45b, a colorimeter 46, and catch trays 47 and 48 where sheet Sh is ejected after transported through the transport path 41.

The readers 45a and 45b exemplify image input devices such as an image sensor. For example, the readers 45a and 45b radiate the light to the surface of sheet Sh and incorporate the reflected light from sheet Sh as image data. Hereinafter, "reading" signifies an operation of the readers 45a and 45b to incorporate image data on sheet Sh. The reader 45a reads sheet Sh transported through the transport path 41 from under the transport path 41. The reader 45b reads sheet Sh transported through the transport path 41 from above the transport path 41. In the description below, the readers 45a and 45b are generically denoted as a "reader 45" to avoid the distinction. The reader 45 outputs the incorporated image data to the image processing apparatus 5.

The colorimeter 46 exemplifies a color densitometer that reads an image formed on the surface of sheet Sh transported through the transport path 41 and measures the color density (reflection density) of the image based on image information acquired by reading the image. For example, the colorimeter 46 can measure the reflected light intensity (spectrum) for each wavelength of light and outputs the density (reflection density) or L*a*b* values of the measured color. For example, the colorimeter 46 uses a scanner (line sensor) including a plurality of unshown sensors (photoelectric conversion elements) unidimensionally placed all over the paper width direction (orthogonal to the paper transportation direction). When the colorimeter 46 is configured as a scanner, the scanner moves in the direction (paper transportation direction) orthogonal to the direction of placing the scanner to read an image. The colorimeter 46 divides a region to read the image into subregions in the form of a mesh and measures the color density of the image formed on sheet Sh in units of the subregions. The colorimeter 46 outputs information about the measured color density to the image processing apparatus 5.

The colorimeter 46 may be configured as a single sensor that is two-dimensionally moved to measure the color density of an image formed on sheet Sh. Alternatively, the colorimeter 46 may be configured as a plurality of sensors two-dimensionally placed (in a matrix) to read color densities of all pixels on the sheet in a single measurement.

The image inspecting apparatus 3 includes the transport paths 42 and 43 connected to the transport path 41.

The transport path 42 branches in the middle of the transport path 41 and ejects sheet Sh inspected by the image processing apparatus 5 to the catch tray 47 (an example paper ejector). The catch tray 47 accepts ejected sheet Sh (also denoted as a "normal sheet") whose image is identified as being normal by the image processing apparatus 5.

The transport path 43 also branches in the middle of the transport path 41 and ejects sheet Sh inspected by the image processing apparatus 5 to the catch tray 48 (an example paper ejector). The catch tray 48 accepts ejected sheet Sh (also denoted as an "abnormal sheet") whose image is identified as being abnormal by the image processing apparatus 5.

The changer 44 changes the direction of transporting sheet Sh so that sheet Sh is transported to one of the transport paths 42 and 43. A mix of normal and abnormal sheets are ejected to only one catch tray 47 when provided for the image inspecting apparatus 3. In this case, normal and abnormal sheets are ejected to be slightly displaced in the direction orthogonal to the ejection direction.

The image inspecting apparatus 3 transports sheet Sh as a printed matter containing an image formed on both sides or either side of the printed matter. The image inspecting apparatus 3 reads the image formed by the image forming apparatus 2 on both sides or either side of sheet Sh and allows the image processing apparatus 5 to perform a specified inspection.

The present embodiment enables the image forming apparatus 2 to form images on both sides of sheet Sh and therefore provides an example where the image processing apparatus 5 inspects both sides of sheet Sh. However, the image processing apparatus 5 may inspect only one side of sheet Sh transported from an image forming apparatus that can form images on only one side of sheet Sh.

Configuration of the Control System for the Image Forming Apparatus

Figure 2:
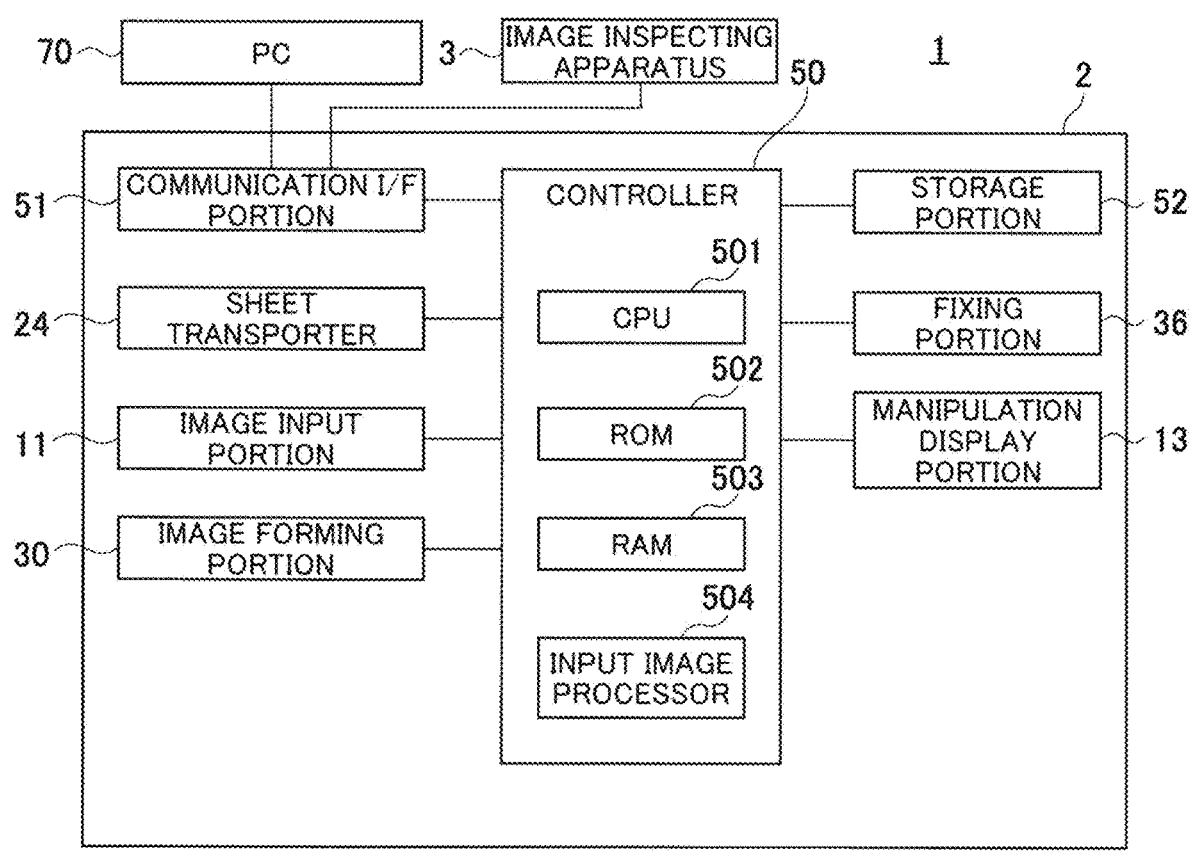
FIG. 2 is a block diagram illustrating an example configuration of a control system for an image forming apparatus according to the first embodiment of the present invention.

With reference to FIG. 2, the description below explains an example configuration of the control system for the image forming apparatus 2.

FIG. 2 is a block diagram illustrating an example configuration of the control system for the image forming apparatus 2.

The image forming apparatus 2 includes a communication I/F portion 51, a sheet transporter 24, the image input portion 11, the image forming portion 30, the controller 50, a storage portion 52, the fixing portion 36, and the manipulation display portion 13.

The communication I/F portion 51 provides an interface that uses a network or a dedicated line to transmit and receive data from the PC 70 as a terminal manipulated by an operator. The communication I/F portion 51 uses a NIC (Network Interface Card), for example.

Under control of the controller 50, the sheet transporter 24 drives the transport path 21, a transport roller (unshown)

provided for the reversing transport path 22, and the reversing portion 23 illustrated in FIG. 1.

The controller 50 includes a CPU (Central Processing Unit) 501, a ROM (Read Only Memory) 502, a RAM (Random Access Memory) 503, and an input image processor 504.

The ROM 502 stores a program executed by the CPU 501 of the controller 50 or data used for the execution of the program. The ROM 502 is used as an example non-transitory computer-readable storage medium that stores a program executed by the CPU 501. The ROM 502 permanently stores the program. The CPU 501 reads the program saved in the ROM 502 and thereby controls the components configuring the image forming apparatus 2.

The RAM 503 temporarily stores variables or parameters generated during an arithmetic operation of the CPU 501.

An input image is contained in a job entered from the PC 70 via the communication I/F portion 51. The input image processor 504 performs a specified image process (such as a rasterization process) on the input image to generate image data for printing. The input image processor 504 also generates image data for printing by performing the image process on image data acquired from a document read from the image input portion 11 through the use of the ADF 12 or externally acquired image data. The image data for printing is transmitted to the image forming portion 30.

The controller 50 controls the sheet transporter 24 to drive the transport roller and transport sheet Sh through the transport path 21. When the input image processor 504 generates image data for printing, the controller 50 outputs the image data for printing to the image forming portion 30. The controller 50 controls the image forming portion 30 to form an image on sheet Sh. The controller 50 controls the fixing portion 36 to fix the image on sheet Sh.

The controller 50 receives a manipulation signal from the manipulation display portion 13 and provides control corresponding to the manipulation signal. The controller 50 also outputs a display signal to the manipulation display portion 13. The manipulation display portion 13 allows a display panel to display various setup screens to enter various manipulation instructions or setup information and a manipulation screen to display various process results. The information displayed on the manipulation display portion 13 includes an abnormal image detection result 631 and an alignment evaluation result 632 (see FIG. 3 to be described) output from the image inspecting apparatus 3.

The storage portion 52 may store parameters used for the CPU 501 of the controller 50 to execute a program or data acquired by executing the program. For example, the storage portion 52 stores information such as image formation conditions corresponding to density levels. The storage portion 52 may store a program executed by the CPU 501.

Configuration of the Control System for the Image Inspecting Apparatus

The description below explains an example configuration of the control system for the image inspecting apparatus 3 with reference to FIG. 3.

Figure 3:
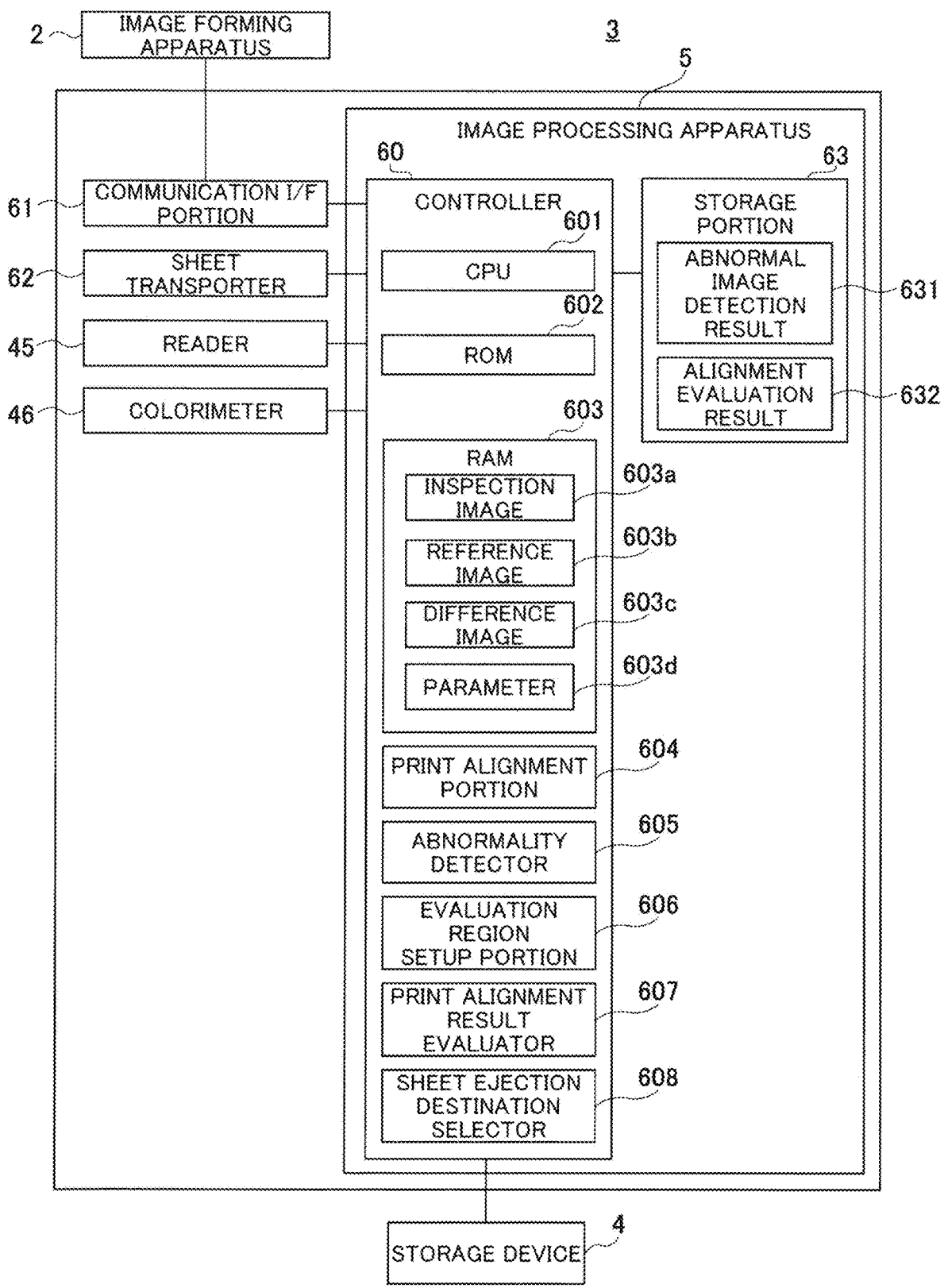
FIG. 3 is a block diagram illustrating an example configuration of a control system for an image inspecting apparatus according to the first embodiment of the present invention.

FIG. 3 is a block diagram illustrating an example configuration of the control system for the image inspecting apparatus 3.

The image inspecting apparatus 3 includes a communication I/F portion 61, a sheet transporter 62, a reader 45, and the colorimeter 46. The image processing apparatus 5 is attached to the image inspecting apparatus 3 and includes a controller 60 and a storage portion 63. The image processing apparatus 5 includes a storage device 4.

The communication I/F portion 61 provides an interface that uses a network to transmit and receive data from the image forming apparatus 2. The communication I/F portion 61 uses a NIC, for example.

Under control of the controller 60, the sheet transporter 62 drives a transport roller (unshown) provided for the transport path 41 illustrated in FIG. 1.

As above, the reader 45 reads images formed on both sides of sheet Sh transported through the transport path 41. The present embodiment inspects image data read by the readers 45a and 45b to align images. Therefore, image data on sheet Sh is described as an "inspection image." An image as the reference to compare with the inspection image is described as a "reference image." The reader 45 reads the reference image in advance. An operator identifies the reference image as being correct in advance. The reader 45 can read an image formed on sheet Sh by the image forming apparatus 2 and generate an inspection image 603a and a reference image 603b. The present embodiment aligns the inspection image and the reference image to inspect whether a printout image is formed at correct positions corresponding to four corners of sheet Sh.

The RAM 603 of the controller 60 saves an image read by the reader 45 as the inspection image 603a or the reference image 603b. The inspection image 603a and the reference image 603b may be saved in the storage portion 63 mainly including a large-capacity HDD. The inspection image 603a and the reference image 603b may contain the information about the color density output from the colorimeter 46 to the image inspecting apparatus 3.

The controller 60 includes a CPU 601, a ROM 602, a RAM 603, a print alignment portion 604, an abnormality detector 605, an evaluation region setup portion 606, a print alignment result evaluator 607, and a sheet ejection destination selector 608.

The CPU 601 reads the program saved in the ROM 602 and thereby controls the components configuring the image inspecting apparatus 3

The ROM 602 stores a program executed by the CPU 601 of the controller 60 or data used for the execution of the program.

The RAM 603 temporarily stores variables or parameters generated during an arithmetic operation of the CPU 601. As above, the RAM 603 also saves the inspection image 603a and the reference image 603b. The RAM 603 also saves a difference image 603c and a parameter 603d.

The parameter 603d includes various types of values settled by the controller 60. For example, the parameter 603d includes values for M pixels and N pixels to settle an evaluation region 82 in FIG. 6 and threshold value Th calculated during the process in FIG. 8 to be described later. The print alignment portion 604, the abnormality detector 605, the evaluation region setup portion 606, the print alignment result evaluator 607, and the ejection destination selector 608 perform various processes based on values read from the parameter 603d.

The ROM 602 is used as an example non-transitory computer-readable storage medium that stores a program executed by the CPU 601. The ROM 602 permanently stores the program. The CPU 601 reads the program saved in the ROM 602 to provide functions of the print alignment portion 604, the abnormality detector 605, the evaluation region setup portion 606, the print alignment result evaluator 607, and the ejection destination selector 608.

The print alignment portion 604 aligns a print position of the inspection image 603a with a print position of the reference image 603b as the reference of good-item inspection for an image formed on sheet Sh. Based on a document image input to the image forming apparatus 2, the print alignment portion 604 aligns the print position of the inspection image 603a with the print position of the reference image 603b. The inspection image 603a is generated by reading the same printout images formed on a plurality of sheets Sh. When the document size is unchanged, an image contained in the inspection image 603a should maintain the same print position on a plurality of printed matters. Therefore, the print alignment portion 604 aligns the inspection image 603a read from the RAM 603 with the position of the reference image 603b previously stored in the RAM 603.

The abnormality detector 605 detects an abnormality in the inspection image 603a based on a difference between the reference image 603b and the inspection image 603a after both print positions are aligned. The difference between the reference image 603b and the inspection image 603a is represented as the difference image 603c at the bottom right in FIG. 5 to be described later. The abnormality detector 605 generates one page of the difference image 603c corresponding to one side of sheet Sh where an image is formed after one-side printing. The abnormality detector 605 generates two pages of the difference image 603c corresponding to both sides of sheet Sh where an image is formed after both side printing. The generated difference image 603c is stored in the RAM 603.

The abnormality detector 605 determines the inspection image 603a to be normal if there is no difference between the inspection image 603a and the reference image 603b. For example, the abnormality detector 605 determines an image to be normal if the image formed on sheet Sh contains no stain or seam. The abnormality detector 605 determines an image to be abnormal if the image formed on sheet Sh contains stain or seam. The abnormality detector 605 compares the reference image 603b with the inspection image 603a generated by reading an image formed on sheet Sh to determine whether the image is formed at the correct position on sheet Sh.

When a page contains stain, the inspection image 603a for this page differs from the reference image 603b. The abnormality detector 605 compares the inspection image 603a with the reference image 603b and determines the inspection image 603a to be abnormal if a difference is found. Then, the abnormality detector 605 generates an abnormal image detection result 631 for each job and stores the abnormal image detection result 631 in the storage portion 63. The abnormal image detection result 631 contains a collection of abnormal images corresponding to the inspection image 603a determined to be abnormal. The abnormal image detection result 631 is provided as a PDF (Portable Document Format) file, for example. The abnormal image detection result 631 contains text-format data such as stain position or size and a page number corresponding to the abnormality occurred, namely, factors causing the abnormality detector 605 to determine the inspection image 603a to be abnormal. The abnormal image detection result 631 may contain the inspection image 603a determined to be abnormal. The abnormal image detection result 631 may be stored in the RAM 603.

Even though the page contains no stain, for example, inaccurate alignment between the inspection image 603a and the reference image 603b causes the inspection image 603a to be identified as being abnormal. To solve this, the evaluation region setup portion 606 settles an evaluation region to evaluate an alignment result.

The evaluation region setup portion 606 defines a first evaluation-exclusion region that diverges from an edge calculated from the reference image 603b up to a first specified quantity and disallows the evaluation of a print position alignment result. For example, the edge of a printout image represents part of the printout image such as a contour that maximizes a change rate for pixel values. The evaluation region setup portion 606 defines an evaluation region that is apart from the first evaluation-exclusion region, diverges from the edge of the printout image up to a second specified quantity larger than the first specified quantity, and allows the evaluation of a print position alignment result. Besides, the evaluation region setup portion 606 defines a second evaluation-exclusion region that is apart from the second specified quantity and disallows the evaluation of a print position alignment result.

Figure 6:
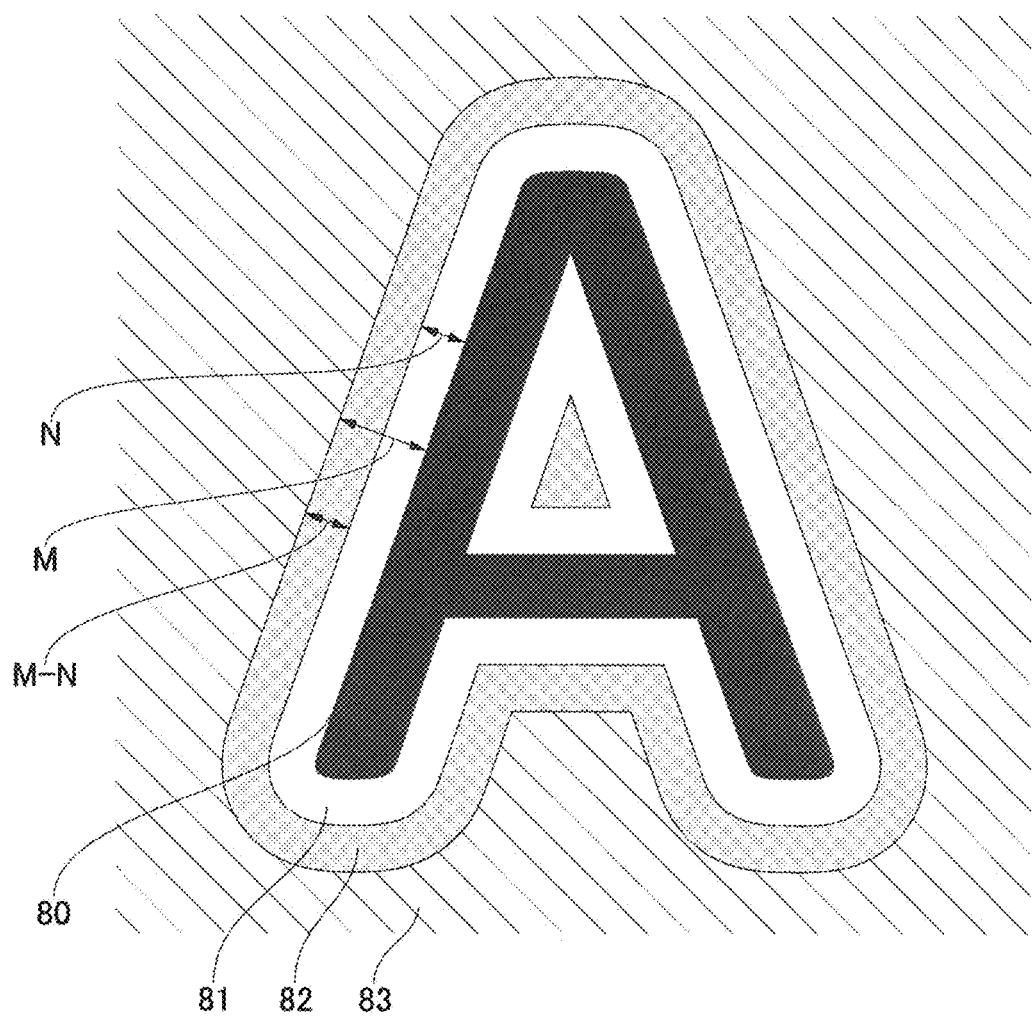
FIG. 6 illustrates a region to be evaluated as a result of alignment according to the first embodiment of the present invention.

For example, the evaluation region is represented as a belt-like region (evaluation region 82) that diverges from the edge of a printout image for a specified distance as illustrated in FIG. 6 to be described later. When the abnormality detector 605 determines the inspection image 603a to be abnormal, the print alignment result evaluator 607 uses the evaluation region to evaluate the alignment of the inspection image 603a compared to the reference image 603b.

The print alignment result evaluator 607 evaluates whether the alignment between the reference image 603b and the inspection image 603a causes a correct result. The print alignment result evaluator 607 calculates the dispersion (such as standard deviation) of differences that are included in the evaluation region around the edge calculated from a printout image included in the reference image 603b and are calculated from the inspection image 603a where an abnormality is detected. Based on the difference dispersion, the print alignment result evaluator 607 evaluates a print position alignment result generated by combining the print position of the reference image 603b with the print position of the inspection image 603a where an abnormality is detected. When the quantity of the difference dispersion exceeds specified threshold value Th, for example, the print alignment result evaluator 607 evaluates that the inspection image 603a is misaligned in comparison with the reference image 603b. However, when the abnormality detector 605 does not detect an abnormality contained in the inspection image 603a, the print alignment result evaluator 607 does not evaluate the print position alignment result.

The evaluation region setup portion 606 generates an evaluation target region (see FIG. 9 to be described) by dividing the difference image 603c into a specified number of regions after the abnormality detector 605 generates the difference image 603c based on a difference between the reference image 603b and the inspection image 603a. In this case, the print alignment result evaluator 607 evaluates the misalignment amount of the inspection image 603a in comparison with the reference image 603b in units of evaluation target regions. When the amount of dispersion of differences calculated in one or more evaluation target regions exceeds threshold value Th, the print alignment result evaluator 607 evaluates that the inspection image 603a is misaligned with the reference image 603b.

The print alignment result evaluator 607 then generates the alignment evaluation result 632 for each job and saves the alignment evaluation result 632 in the storage portion 63. The alignment evaluation result 632 is a collection of alignment errors in the inspection image 603a determined to contain a misaligned print position. The alignment evaluation result 632 is provided as a PDF file, for example. The alignment evaluation result 632 contains text-format data such as the inspection image 603a and the page number of a page determined by the print alignment result evaluator 607 to be abnormally aligned.

The alignment evaluation result 632 is stored in the storage portion 63 and is also transmitted to the external storage device 4 connected to the image inspecting apparatus 3. The storage device 4 may be provided as USB (Universal Serial Bus) memory, SSD (Solid State Drive), or HDD (Hard Disk Drive) connected to the image inspecting apparatus 3. When the alignment evaluation result 632 is transmitted to the storage device 4, an operator can display the alignment evaluation result 632 stored in the storage device 4 and confirm the contents. The alignment evaluation result 632 may be transmitted to and stored in a cloud server or the PC 70 connected via the communication I/F portion 61.

As needed, the controller 60 transmits the abnormal image detection result 631 and the alignment evaluation result 632 read from the storage portion 63 to the image forming apparatus 2 or the PC 70 via the communication I/F portion 61. The image forming apparatus 2 can display the abnormal image detection result 631 and the alignment evaluation result 632 on the manipulation display portion 13. Therefore, the operator on the image forming apparatus 2 and the image inspecting apparatus 3 can confirm the contents of the abnormal image detection result 631 and the alignment evaluation result 632 by using the manipulation display portion 13. The operator can also confirm the contents of the abnormal image detection result 631 and the alignment evaluation result 632 by using the PC 70.

The print alignment result evaluator 607 can direct the image forming apparatus 2 to perform a "recovery process" via the communication I/F portion 61. The recovery process reprints the page corresponding to the inspection image 603a determined to be abnormal. The recovery process can allow the image forming apparatus 2 to regenerate the image corresponding to the inspection image 603a the print alignment result evaluator 607 evaluated as an "alignment error" indicating the misalignment. The recovery process is performed automatically by the image forming system 1 or manually by the operator. However, the recovery process, if performed, increases the processing time for the image forming apparatus 2. Therefore, the operator to use the image forming system 1 can previously determine whether to perform the recovery process on the image forming apparatus 2 when an abnormality is identified.

When configured to perform the recovery process, the image forming apparatus 2 automatically performs the recovery process on the page corresponding to the inspection image 603a determined to contain an abnormality or an alignment error based on the directive from the print alignment result evaluator 607. As above, normal sheets are ejected to the catch tray 47 and abnormal sheets are ejected to the catch tray 48. Therefore, the catch tray 47 collects only ejected normal sheets that are printed by an initial image formation process or the recovery process.

The sheet ejection destination selector 608 selects the catch tray (an example ejection destination) for sheet Sh transported via the transport path 41 based on results from the abnormality detector 605 and the print alignment result evaluator 607. For example, the abnormality detector 605 determines that an image formed on sheet Sh is not abnormal, namely, normal. Then, sheet Sh is identified as a normal sheet. The sheet ejection destination selector 608 operates the changer 44 to transport the normal sheet through the transport path 42 and ejects the normal sheet to the catch tray 47. Meanwhile, the abnormality detector 605 determines that an image formed on sheet Sh is abnormal. Then, sheet Sh is identified as an abnormal sheet. Sheet Sh is also identified as an abnormal sheet when the print alignment result evaluator 607 determines that sheet Sh is misaligned. The sheet ejection destination selector 608 operates the changer 44 to transport the abnormal sheet through the transport path 43 and ejects the abnormal sheet to the catch tray 48.

The description below explains a method of evaluating the alignment according to the present embodiment with reference to FIGS. 4 through 7.

Figure 4:
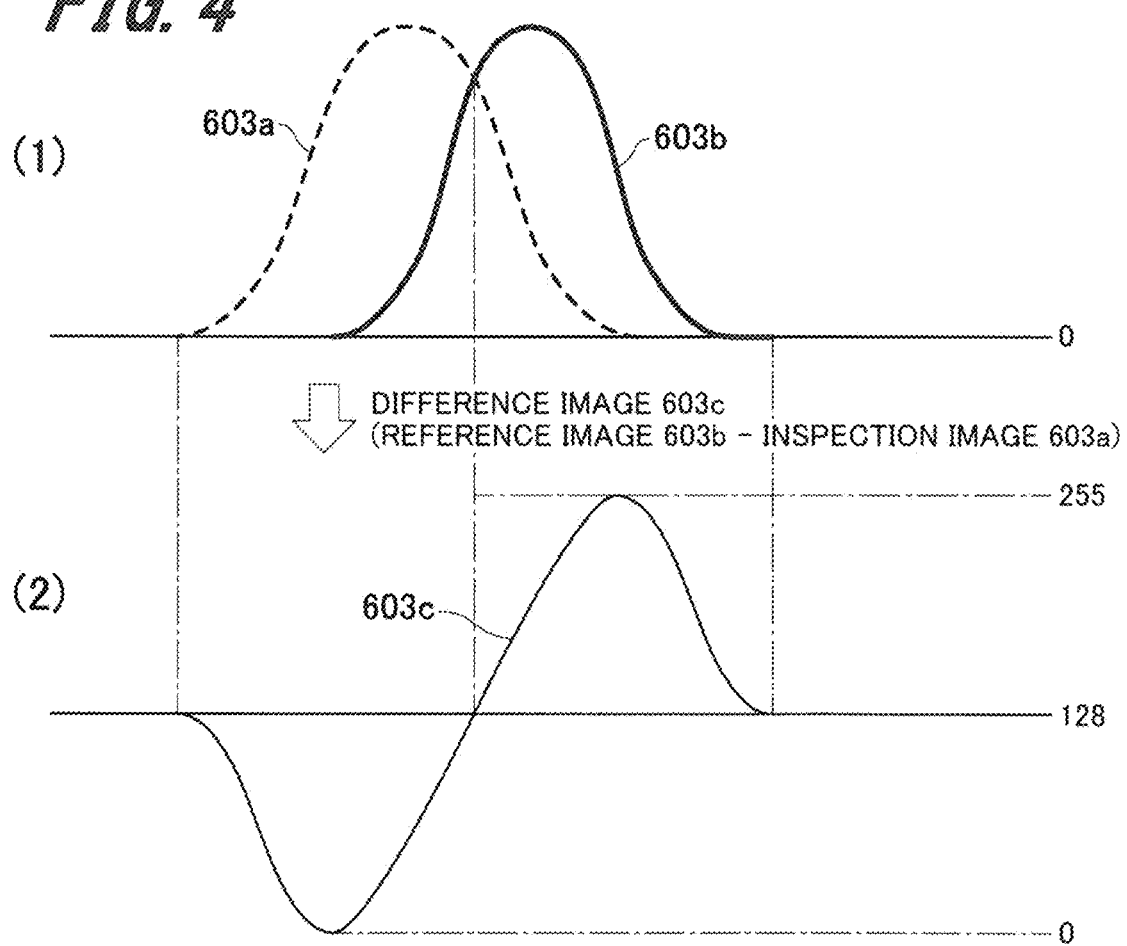
FIG. 4 illustrates how to find a difference between a reference image and an inspection image according to the first embodiment of the present invention.

FIG. 4 is an explanatory diagram illustrating how to find a difference between the inspection image 603a and the reference image 603b.

Graph (1) at the upper part of FIG. 4 illustrates a result of plotting pixel values for the inspection image 603a and the reference image 603b at the same position in an image. If the inspection image 603a and the reference image 603b are misaligned, the inspection image 603a and the reference image 603b are also differently positioned. Therefore, the inspection image 603a and the reference image 603b are represented as two normal distribution graphs.

Graph (2) at the lower part of FIG. 4 illustrates the difference image 603c generated by using differences between the inspection image 603a and the reference image 603b. Pixel values of the difference image 603c are normalized to take specified values within the range between "0" and "255." If the difference image 603c is monochrome, for example, pixel value "0" represents black and pixel value "255" represents white.

At the left of graph (1), the inspection image 603a and the reference image 603b do not overlap. The difference image 603c indicates pixel value 0. The difference image 603c indicates pixel value 128 at the point where the inspection image 603a coincides with the reference image 603b in terms of pixel values. At the right of graph (1), the inspection image 603a and the reference image 603b do not overlap. The difference image 603c indicates pixel value 255. Then, the difference image 603c is gradationally represented per pixel values as illustrated in FIG. 5.

If the inspection image 603a and the reference image 603b are aligned, the inspection image 603a and the reference image 603b are represented as one normal distribution graph. The difference image 603c indicates pixel value 128. The difference image 603c is represented with constant density.

Figure 5:
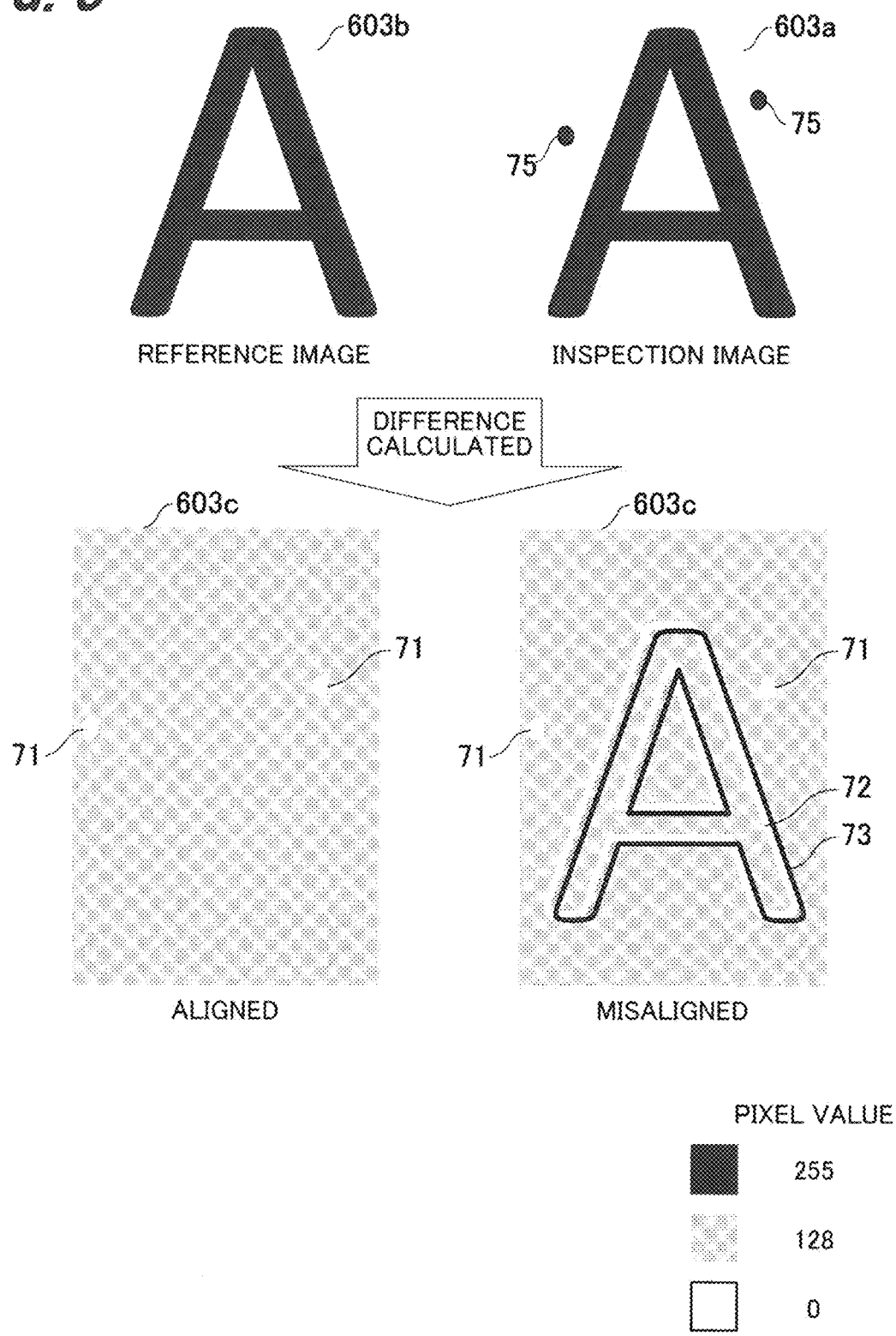
FIG. 5 is an explanatory diagram illustrating a reference image and an inspection image according to the first embodiment of the present invention.

FIG. 5 is an explanatory diagram illustrating specific examples of the reference image 603b and the inspection image 603a. The description below explains the inspection image 603a and the reference image 603b read from sheet Sh where an image of character "A" is formed.

The abnormality detector 605 acquires a difference between the inspection image 603a and the previously generated reference image 603b to detect an abnormality in the inspection image 603a. For example, the reference image 603b illustrated in the upper part of FIG. 5 contains only character "A." The inspection image 603a is assumed to contain a stain 75 around character "A." The reference image 603b includes only character "A" as an example of the printout image. The inspection image 603a includes character "A" and the stain 75 as an example of the printout image.

When the inspection image 603a and the reference image 603b are not misaligned and are therefore normally aligned, as illustrated at the bottom left of FIG. 5, character "A" does not appear in the difference image 603c and a stain 71 with pixel value "255" appears at the positions corresponding to the stain 75. Except for the stain 71, the difference image 603c is generated with the constant density of pixel value "128." The abnormality detector 605 determines the inspection image 603a to be abnormal based on the stain 71 appearing in the difference image 603c.

When the inspection image 603a and the reference image 603b are misaligned and are therefore abnormally aligned, as illustrated at the bottom right of FIG. 5, character "A" appears with the stain 71 of pixel value "255." In this case, character "A" is represented as a character 72 in white of pixel value "255" and a character 73 in black of pixel value "0." The abnormality detector 605 determines the inspection image 603a to be abnormal based on the characters 72 and 73 in addition to the stain 71 appearing in the difference image 603c.

The characters 72 and 73 appearing in the difference image 603c are all determined as abnormal images without evaluation on the alignment between the reference image 603b and the inspection image 603a. Even if the stain 75 is not attached to the inspection image 603a, misalignment between the reference image 603b and the inspection image 603a may cause the abnormality detector 605 to determine the inspection image 603a to be abnormal. When an abnormality is detected in the inspection image 603a, it is necessary to confirm whether the inspection image 603a is normally aligned. Standard deviation D (example difference dispersion) is calculated from pixel values of pixels configuring the difference image 603c and is used to evaluate whether an alignment result is normal. The difference image 603c at the bottom left of FIG. 5 shows a normal alignment result. The difference image 603c at the bottom right of FIG. 5 shows an abnormal alignment result. Standard deviation D for the difference image 603c at the bottom right is obviously larger than standard deviation D for the difference image 603c at the bottom left.

However, the actual alignment somewhat causes differences around the edge due to causes such as dispersion of image distortion during printing. Therefore, the image forming apparatus 2 permits misalignment of the inspection image 603a to a certain degree. It is possible to permit the misalignment by changing difference-based detection levels depending on the vicinity of the printout image edge and regions other than the edge. For example, the misalignment at a level determined to be normal can determine the inspection image 603a to be normal. Alignment results are not evaluated at a region adjacent to the character image.

Standard deviation D is unaffected even if misalignment occurs in a uniform image region or an image region that is considerably distant from the edge and contains no printout image. Such a region, if used to evaluate the alignment, decreases the value of standard deviation D and lowers the sensitivity to detect the misalignment. Therefore, the present embodiment does not evaluate alignment results on the region that is considerably distant from the edge of a printout image.

With reference to FIG. 6, the description below explains a range to permit the misalignment of the inspection image 603a. FIG. 6 is an explanatory diagram illustrating regions used to evaluate alignment results. The description below uses an enlarged version of character "A" contained in the reference image 603b. A region to form character "A" is described as a character image region 80.

Alignment results are not evaluated in a belt-like region that is adjacent to the edge of character "A" and is formed along character "A." This region is described as a first evaluation-exclusion region 81. The width of the first evaluation-exclusion region 81 is expressed in the length of N pixels, for example. The size of the first evaluation-exclusion region 81 is settled based on the amount of misalignment that may occur when character "A" is normally printed. The alignment is evaluated to be correct within the first evaluation-exclusion region 81 even if character "A" contained in the inspection image 603a is misaligned.

Alignment results are evaluated in a belt-like region that is formed along the first evaluation-exclusion region and is described as the evaluation region 82. The width of the evaluation region 82 is expressed in M–N pixels (M>N), for example. An alignment error is evaluated within the evaluation region 82 when character "A" contained in the inspection image 603a is misaligned.

The evaluation region setup portion 606 can find the evaluation region 82 based on the maximum size of character "A" that may result from partial variable magnification applied to character "A." However, an excessive increase in the evaluation region 82 reduces the sensitivity to evaluate alignment results (or to determine whether the misalignment occurs). The evaluation region setup portion 606 may previously vary the size of the evaluation region 82 in various types of images and find the size that starts reducing the sensitivity to evaluate alignment results. This size may be used as the evaluation region 82.

Alignment results are not evaluated in a region that is distant from the edge of character "A" by M pixels or more and is described as a second evaluation-exclusion region 83. A misprint is likely to occur when character "A" contained in the inspection image 603a is misaligned up to the second evaluation-exclusion region 83. The abnormality detector 605 determines the inspection image 603a to be abnormal.

Figure 7:
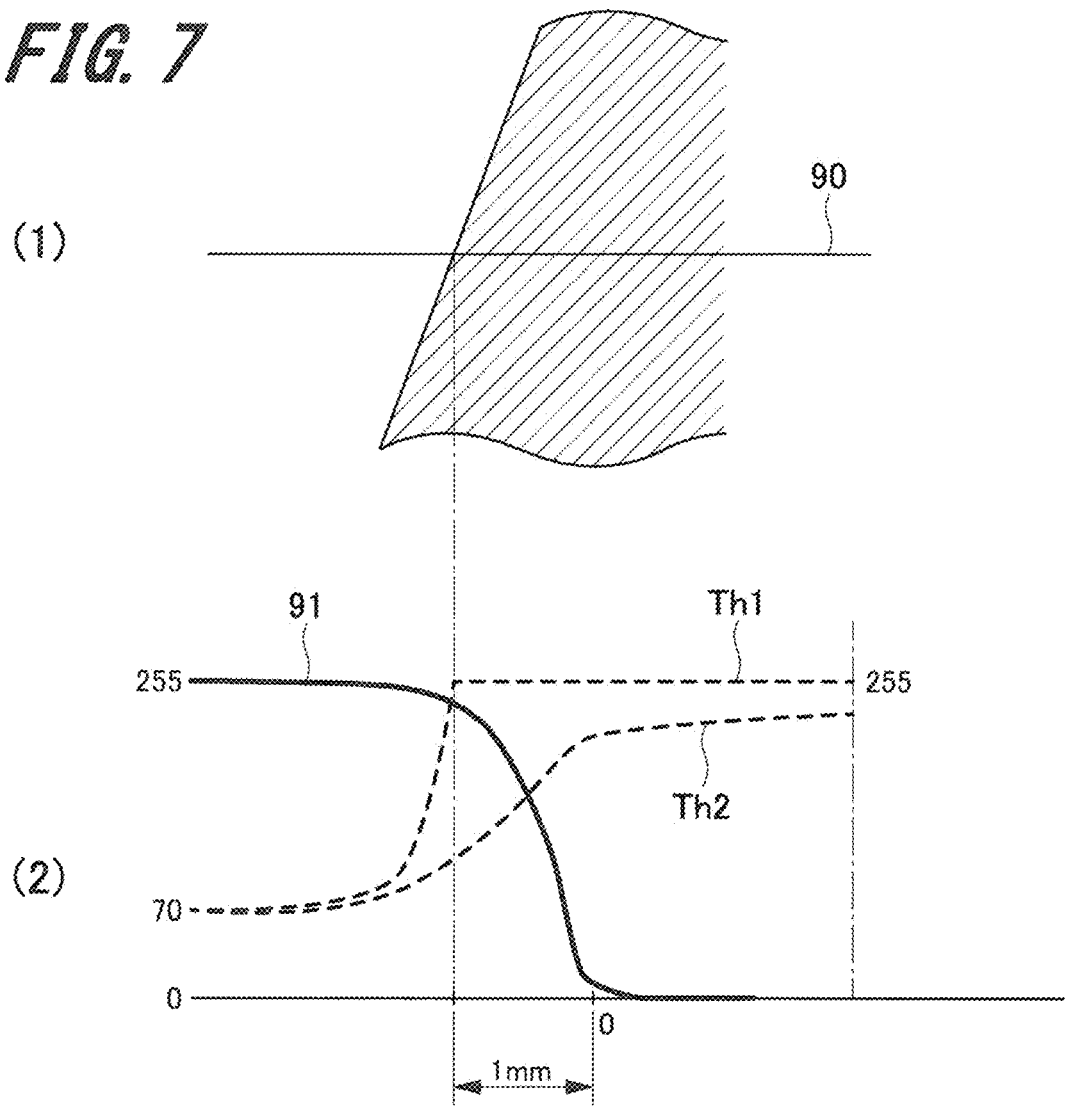
FIG. 7 is an explanatory diagram illustrating the relationship between an edge of character "A" and threshold value Th according to the first embodiment of the present invention.

FIG. 7 is an explanatory diagram illustrating the relationship between the edge of character "A" and threshold value Th.

Enlarged image (1) in FIG. 7 shows a partially enlarged part of character "A." The description below explains changes in pixel values of character "A" along a line 90 crossing character "A."

Graph (2) in FIG. 7 shows changes in pixel values of character "A." A solid line 91 indicates pixel value "255" corresponding to white or the absence of character "A" and pixel value "0" corresponding to black or the presence of character "A." Threshold value Th is settled to determine the abnormality of the inspection image 603a. When the background color of character "A" is white, for example, the left part of graph (2) is also white. When this part contains a stain, for example, the solid line 91 varies to drop. When threshold value Th "70" is settled for the white part, the inspection image 603a is determined to be abnormal if there is darkening or stain corresponding to the pixel value smaller than 70.

When the color of character "A" is black and threshold value Th for the white part is unchanged, character "A" is determined to be stained and the inspection image 603a is determined to be abnormal. To solve this, the part of character "A" changes to increase threshold value Th. For example, when threshold value is set to "255," the character image region of character "A" is assumed to contain no whitish contamination even if the black color is pale or a gray point is mixed in the character image region of character "A."

To inhibit misalignment of character "A," threshold value Th1 indicated by a broken line is set to rise at the position corresponding to the edge of character "A." In this case, an alignment error is evaluated even if the inspection image 603a is slightly misaligned with the reference image 603b.

However, the edge of character "A" is not always clear. The edge of character "A" may be blurred due to noise such as bleeding. In such a case, threshold value Th2 is set to gently rise within a specified range on condition that misalignment of character "A" is permitted to a certain degree. The range to raise threshold value Th2 is defined to correspond to the length of 1 mm from the edge of character "A." The length of this range represents the length of M−N in FIG. 6, for example. The inspection image 603a is not unconditionally determined to be abnormal in the range to raise threshold value Th2 even if noise occurs at the edge of character "A." As above, changes in the threshold value Th can settle the evaluation region 82 as illustrated in FIG. 6.

The description below explains an alignment evaluation process performed in the image inspecting apparatus 3.

Figure 8:
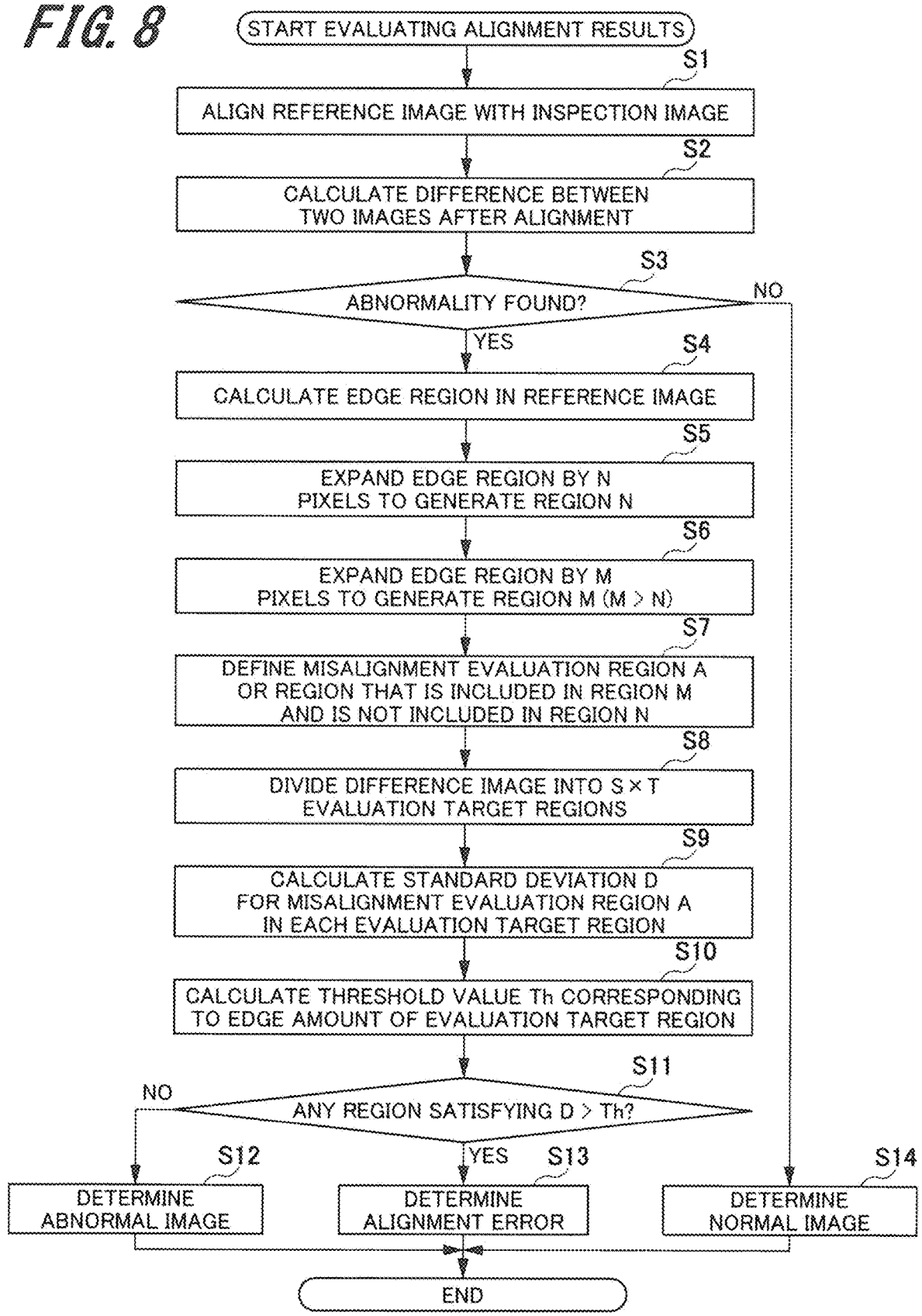
FIG. 8 is a flowchart illustrating a process in which the image inspecting apparatus according to the first embodiment of the present invention evaluates an inspection image.

FIG. 8 is a flowchart illustrating a process for the image inspecting apparatus 3 to evaluate the inspection image 603a.

The print alignment portion 604 previously aligns print positions of the inspection image 603a read from the RAM 603 with the reference image 603b (S1). The abnormality detector 605 finds a difference between the reference image 603b and the inspection image 603a (S2), generates the difference image 603c, and, based on the difference image 603c, determines whether the inspection image 603a is abnormal (S3). If the inspection image 603a is not abnormal (NO in S3), the abnormality detector 605 determines the inspection image 603a to be normal (S14) and terminates the process.

The sensitivity for differences is reduced around the edge of the reference image 603b. If the inspection image 603a is abnormal (YES in S3), the stain 71 appears in the difference image 603c as illustrated at the bottom left in FIG. 5. In this case, the evaluation region setup portion 606 calculates the edge of a printout image such as a character contained in the reference image 603b (S4).

The evaluation region setup portion 606 expands an edge region by N pixels to generate region N (S5) and expands the edge region by M pixels to generate region M (S6). The edge region here denotes a character image region representing character "A" illustrated in FIG. 6 and a printout image containing the edge whose alignment result is to be evaluated. Region M corresponds to the range from the edge of character "A" illustrated in FIG. 6 to the evaluation region 82. Region N corresponds to the range from the edge of character "A" to the first evaluation-exclusion region 81.

The evaluation region setup portion 606 defines misalignment evaluation region A or a region that is included in region M and is not included in region N (S7). Misalignment evaluation region A corresponds to a remainder resulting from subtracting region N from region M, namely, the evaluation region 82 as illustrated in FIG. 6.

The print alignment result evaluator 607 divides the difference image 603c into S×T regions (S8). The description below explains the difference image 603c divided into S×T regions with reference to FIG. 9.

Figure 9:
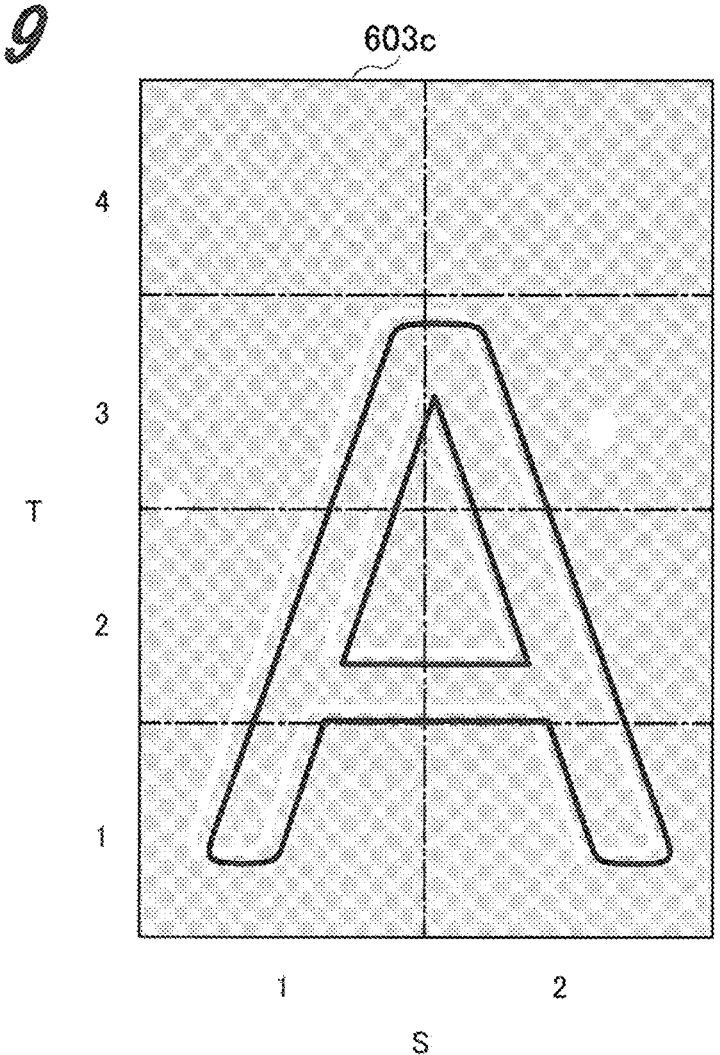
FIG. 9 is an explanatory diagram illustrating a difference image divided into S×T regions according to the first embodiment of the present invention.

FIG. 9 is an explanatory diagram illustrating the difference image 603c divided into S×T regions.

The difference image 603c is horizontally divided into S (2) and is vertically divided into T (4) to be represented by eight evaluation target regions. For example, a combination of (S, T) is used to represent the evaluation target regions. Evaluation target regions (1, 1), (1, 2), (1, 3), (2, 1), (2, 2), and (2, 3) contain parts of character "A." However, evaluation target regions (1, 4) and (2, 4) do not contain parts of character "A."

The present embodiment divides the difference image 603c into S×T evaluation target regions and evaluates the result of aligning the evaluation target regions. For example, when the alignment of inspection image 603a increases misalignment in parts of the inspection image 603a containing a small amount of information (such as regions (1, 4) and (2, 4) in the difference image 603c illustrated in FIG. 9), the calculation of standard deviation D for the entire image may decrease the value of standard deviation D.

As illustrated in FIG. 9, the print alignment result evaluator 607 divides the difference image 603c into eight based on S=2 and T=4 and evaluates the amount of misalignment in the evaluation target regions. The print alignment result evaluator 607 determines that the inspection image 603a is misaligned when standard deviation D exceeds threshold value Th in one or more evaluation target regions.

Returning to the description of FIG. 8, the print alignment result evaluator 607 calculates standard deviation D for misalignment evaluation region A in each evaluation target region of the difference image 603c that is divided into a plurality of evaluation target regions in step S8 (S9).

The print alignment result evaluator 607 calculates threshold value Th corresponding to an edge amount of the evaluation target region (S10). A region containing part of character "A" (edge region) is used as the evaluation target region for alignment results. A region not containing part of character "A" is not used as the evaluation target region.

The print alignment result evaluator 607 changes threshold value Th calculated in step S10 depending on the edge amount of a printout image contained in the evaluation target region. The alignment result evaluation according to the present embodiment sometimes causes the evaluation result to generate a larger numeric value (standard deviation D) from a photo image containing an unclear edge having a small edge amount than from an image containing a clear edge. Therefore, threshold value Th may be decreased corresponding to a large amount of the edge contained in an image (such as characters and graphics). Threshold value Th may be increased corresponding to a small amount of the edge contained in an image (such as photos).

The print alignment result evaluator 607 determines whether there is an evaluation target region satisfying standard deviation D>threshold value Th (S11). If each evaluation target region satisfies standard deviation D≤threshold value Th (NO in S11), the print alignment result evaluator 607 determines the inspection image 603a to be abnormal (S12). The print alignment result evaluator 607 generates the abnormal image detection result 631 and then terminates the process.

If there is at least one evaluation target region satisfying standard deviation D>threshold value Th (YES in S11), the print alignment result evaluator 607 determines the inspection image 603a as an alignment error (S13). The print alignment result evaluator 607 generates the alignment evaluation result 632 and then terminates the process.

Figure 10:
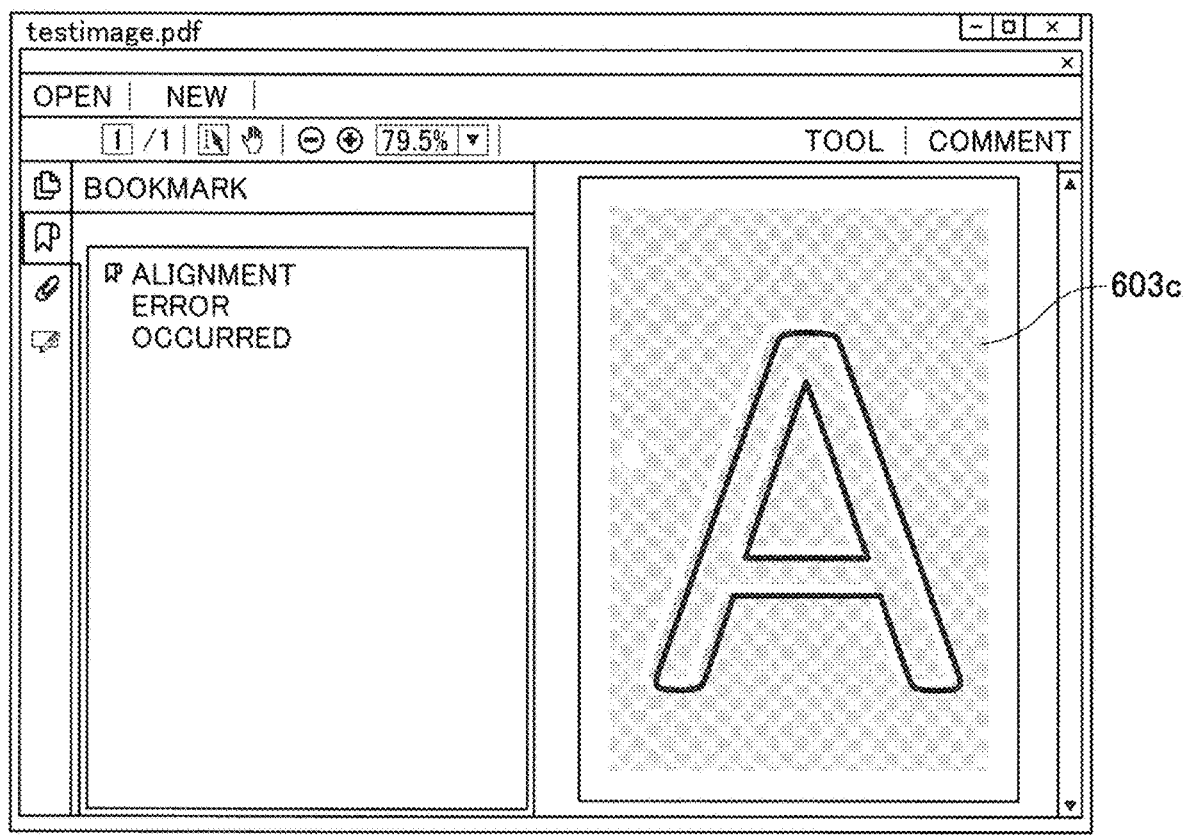
FIG. 10 is an explanatory diagram illustrating the display of an alignment result according to the first embodiment of the present invention.

FIG. 10 is an explanatory diagram illustrating the display of the alignment evaluation result 632. The alignment evaluation result 632 is saved as a PDF data file, for example.

Proper application software can be used to open the alignment evaluation result 632 converted into the PDF format. A bookmark is inserted to show the page where an alignment error occurred. The bookmark shows the error content such as "alignment error occurred." When an operator selects the bookmark, the right part of the screen shows the difference image 603c determined to cause an alignment error. The operator can confirm the number of alignment errors occurred or the page where the alignment error occurred, for example.

The abnormality detector 605 may save the abnormal image detection result 631 as a PDF-format data file. Proper application software may be used to open the abnormal image detection result 631 to display the inspection image 603a determined to be abnormal. Also, in this case, the operator can select a bookmark showing "abnormal image occurred" and confirm the occurrence of an abnormal image or the page containing the abnormal image occurred, for example.

The image inspecting apparatus 3 according to the first embodiment described above evaluates the result of aligning the inspection image 603a based on the difference image 603c generated from a difference between the reference image 603b and the inspection image 603a. Misalignment between the reference image 603b and the inspection image 603a can be determined by comparing standard deviation D calculated from the difference image 603c with threshold value Th. As above, the result of aligning the inspection image 603a is accurately determined. It is possible to easily determine whether the inspection image 603a itself contains an abnormality such as stain or is abnormally aligned.

Whether the result of aligning the inspection image 603a is normal is determined based on the evaluation region 82 (see FIG. 6) generated from an image such as a character contained in the inspection image 603a. Therefore, it is possible to accurately determine the occurrence of an alignment error on the inspection image 603a.

As illustrated in FIG. 6, the evaluation region 82 is represented as a belt-like region surrounding the vicinity of the edge of the printout image. However, the evaluation region 82 may be separated. Only part of the vicinity of the edge may be used as the evaluation region 82. The evaluation region 82 is defined as being remote from the edge by a specified number of pixels. However, the evaluation region 82 is defined as being remote from the edge by a specified distance.

A printout image may be distorted depending on the types of sheet Sh. For example, compared to normal paper, a printout image formed on rough paper is more easily distorted than a printout image for the reference image 603b. In this case, it is favorable to store a relationship between the type of sheet Sh and the evaluation region size in the parameter 603d. The evaluation region setup portion 606 can change the evaluation region size depending on the printout image distortion that varies with types of sheet Sh.

The reader 45 previously reads an image formed on sheet Sh. An operator confirms the read image that is then used as the reference image 603b. However, the input image processor 504 processes an input image. The processed input image may be used as the reference image 603b.

Standard deviation D may be calculated in terms of the difference image 603c as a whole without dividing the difference image 603c and may be compared to threshold value Th.

The image inspecting apparatus 3 includes the image processing apparatus 5 according to the configuration of the present embodiment. However, the PC 70 may include the function of the image processing apparatus 5. The image processing apparatus 5 may be separated from the image inspecting apparatus 3. An image forming system may be configured by providing a server having the function of the image processing apparatus 5. The server may store the inspection image 603a and the reference image 603b the image inspecting apparatus 3 reads from sheet Sh. The server may communicate with the image inspecting apparatus 3, perform a good-item inspection on the inspection image 603a received from the image inspecting apparatus 3, and transmit an evaluation result to the image inspecting apparatus 3 or the PC 70.

Second Embodiment

The description below explains an example configuration of the image forming system according to the second embodiment of the present invention. The image forming system according to the present embodiment is configured so that an image forming apparatus 2A includes the function of the image inspecting apparatus 3 of the image forming system 1 illustrated in FIG. 1. Therefore, the image forming system according to the present embodiment includes major processing portions of the controller 60 in the image inspecting apparatus 3 according to the above-described embodiment.

Figure 11:
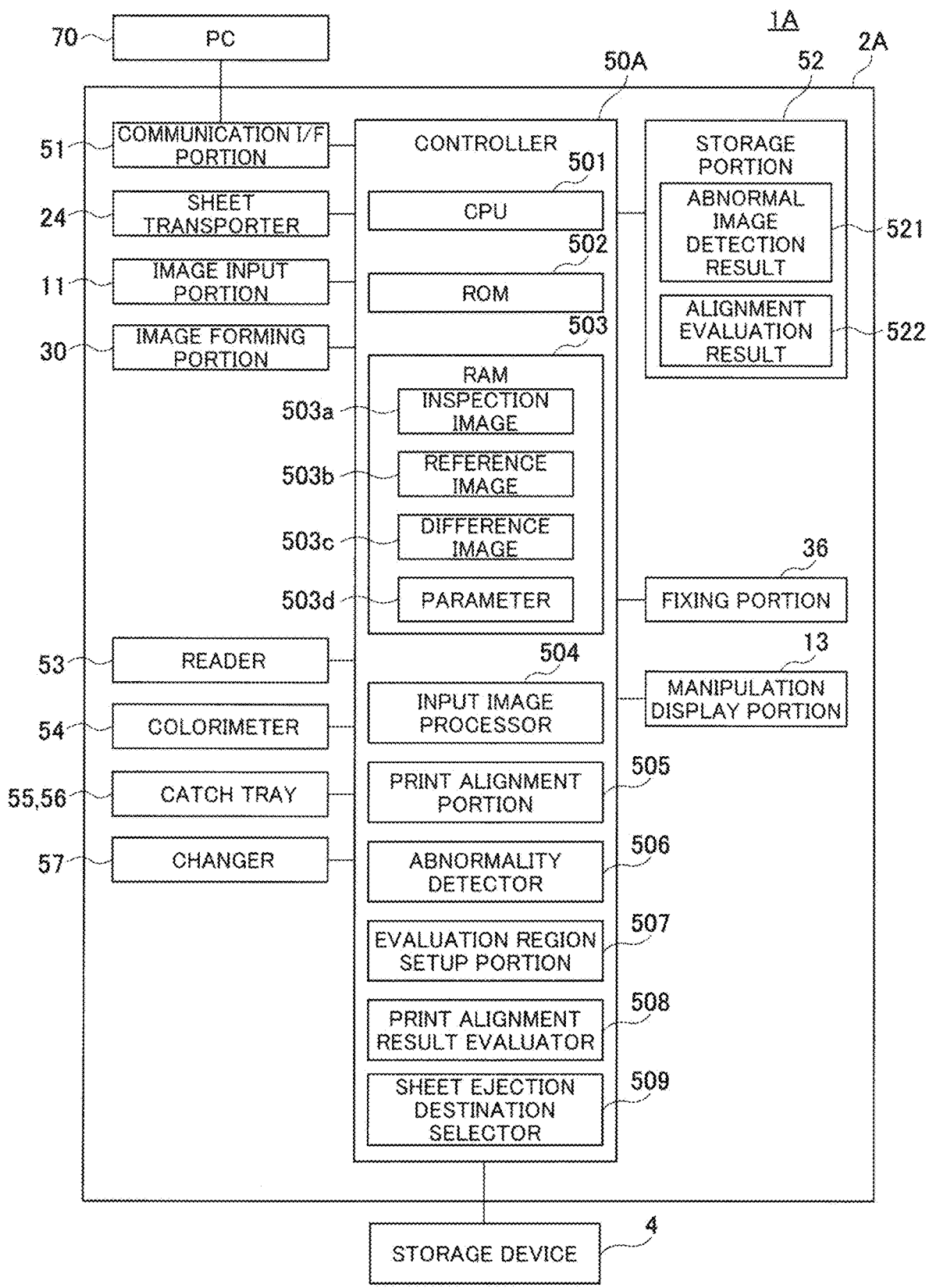
FIG. 11 is a block diagram illustrating the image forming system according to a second embodiment of the present invention.

FIG. 11 is a block diagram illustrating an example configuration of an image forming system 1A.

The image forming system 1A includes the image forming apparatus 2A, the storage device 4, and the PC 70.

The image forming apparatus 2A includes a reader 53, a colorimeter 54, catch trays 55 and 56, and a changer 57 in addition to the portions included in the image forming apparatus 2 illustrated in FIG. 2. The reader 53, the colorimeter 54, the catch trays 55 and 56, and the changer 57 have functions comparable to those of the reader 45, the colorimeter 46, the catch trays 47 and 48, and the changer 44 included in the image inspecting apparatus 3 according to the first embodiment.

The reader 53 and the colorimeter 54 are placed along the transport path 21 downstream of the fixing portion 36.

The reader 53 exemplifies an image input device such as an image sensor. After an image is formed on sheet Sh, the reader 53 reads this sheet Sh from above and from below the transport path 21 and outputs a read image to a controller 50A. The CPU 501 of the controller 50A saves the read image as an inspection image 503a in the RAM 503.

The colorimeter 54 measures the color density of the image formed on sheet Sh.

The controller 50A includes a print alignment portion 505, an abnormality detector 506, an evaluation region setup portion 507, a print alignment result evaluator 508, and a sheet ejection destination selector 509 in addition to the CPU 501, the ROM 502, the RAM 503, the input image processor 504 illustrated in FIG. 2. The functions added to the controller 50A are similar to those of the print alignment portion 604, the abnormality detector 605, the evaluation region setup portion 606, the print alignment result evaluator 607, and the sheet ejection destination selector 608 illustrated in FIG. 3.

The RAM 503 saves the inspection image 503a, a reference image 503b, a difference image 503c, and a parameter 503d, namely, data having the same contents as the data saved in the RAM 603 of the image inspecting apparatus 3.

The parameter 503d provides various types of values settled by the controller 50A. The print alignment portion 505, the abnormality detector 506, the evaluation region setup portion 507, the print alignment result evaluator 508, and the sheet ejection destination selector 509 perform processes related to the above-described embodiments based on preset values read from the parameter 503d.

The print alignment portion 505 aligns a print position of the inspection image 503a with a print position of the reference image 503b used as a reference for the good-item inspection on an image formed on sheet Sh.

The abnormality detector 506 detects an abnormality in the inspection image 503a based on a difference between the reference image 503b and the inspection image 503a whose print positions are aligned.

The evaluation region setup portion 507 settles an evaluation region to evaluate a print position alignment result so that the evaluation region departs from the first evaluation-exclusion region and departs from the edge by a second specified quantity larger than the first specified quantity. The evaluation region setup portion 507 generates an evaluation target region (see FIG. 9) that divides the difference image into a specified number of segments.

The print alignment result evaluator 508 determines whether the result of aligning the inspection image 503a with the reference image 503b is correct. The print alignment result evaluator 508 evaluates the amount of misalignment between the inspection image 503a and the reference image 503b in each evaluation target region. The print alignment result evaluator 508 saves the evaluation result of the alignment as an alignment evaluation result 522 in the storage portion 52.

The sheet ejection destination selector 608 selects the catch tray for sheet Sh transported through the transport path 41 according to the results from the abnormality detector 506 and the print alignment result evaluator 508. The changer 57 is selected according to a directive from the sheet ejection destination selector 509 to change the paper ejection destination of normal paper and abnormal paper.

Similarly to the above-described image forming system 1, the image forming system 1A according to the second embodiment described above also determines normality or abnormality of the inspection image 603a and evaluates the result of aligning the inspection image 603a with the reference image 603b. The manipulation display portion 13 or the PC 70 can display the abnormal image detection result 521 and the alignment evaluation result 522 generated from the pertinent processes. An operator can confirm whether the inspection image 503a contains an abnormality or causes an alignment error, based on the displayed abnormal image detection result 521 and the alignment evaluation result 522.

The present invention can accurately evaluate a print position alignment result by limiting an evaluation region to evaluate a result of aligning an inspection image with a reference image.

The present invention is not limited to the above-mentioned embodiments. It is further understood by those skilled in the art that various applications and modifications may be made in the present invention without departing from the spirit and scope thereof described in the appended claims.

For example, the above-mentioned embodiments describe, in detail and specifically, configurations of the apparatuses and the system in order to explain the present invention for simplicity but are not limited to an entity including all the configurations that have been described. The configuration of one of the above-mentioned embodiments can be partially replaced by the configuration of another embodiment. The configuration of one embodiment can be added to the configuration of another embodiment. The configuration of each embodiment can be partially subject to addition, deletion, or replacement of another configuration.

The control lines or the information lines are provided on condition that they are considered necessary for the sake of description. The description does not cover all control lines or information lines as products. Practically, almost all the configurations can be interconnected.

REFERENCE SIGNS LIST

1 . . . image forming system, 2 . . . image forming apparatus, 3 . . . image inspecting apparatus, 4 . . . storage device, 5 . . . image processing apparatus, 30 . . . image forming portion, 45 . . . reader, 60 . . . controller, 63 . . . storage portion, 81 . . . first evaluation-exclusion region, 82 . . . evaluation region, 83 . . . second evaluation-exclusion region, 603a . . . inspection image, 603b . . . reference image, 603c . . . difference image, 604 . . . print alignment portion, 605 . . . abnormality detector, 606 . . . evaluation region setup portion, 607 . . . print alignment result evaluator, 631 . . . abnormal image detection result, 632 . . . alignment evaluation result

What is claimed is:

1. An image inspecting apparatus comprising:
a reader that reads an image formed by an image forming apparatus on a recording material and generates an inspection image; and
an image processing apparatus that processes the inspection image,
wherein the image processing apparatus includes:
a print alignment portion that aligns a print position of the inspection image with a print position of a reference image used as a reference for a good-item inspection on the image formed on the recording material;
an abnormality detector that detects an abnormality in the inspection image based on a difference between the reference image and the inspection image after print positions are aligned; and
a print alignment result evaluator that evaluates a print position alignment result from aligning a print position of the reference image with a print position of the inspection image, the print alignment result evaluator determines whether an abnormality exists based on dispersion of the difference included in an evaluation region around an edge calculated from a printout image included in the reference image, the difference being calculated from the inspection image;
wherein the evaluation region is distant from the edge of the printout image of the reference image by more than a specified quantity, and a first evaluation-exclusion region is distant from the edge within the specified quantity and is not used to evaluate the printout position alignment.

2. The image inspecting apparatus according to claim 1, further comprising:
an evaluation region setup portion that defines: the first evaluation-exclusion region;
wherein the evaluation region that is distant from the first evaluation-exclusion region, departs from the edge by a second specified quantity larger than the first specified quantity, and evaluates the print position alignment result; and
a second evaluation-exclusion region is distant from the edge by the second specified quantity and is not used to evaluate the print position alignment result.

3. The image inspecting apparatus according to claim 2, wherein the evaluation region setup portion generates an evaluation target region by dividing a difference image into a specified number of segments, the difference image being generated by the abnormality detector based on a difference between the reference image and the inspection image; and wherein the print alignment result evaluator evaluates the amount of misalignment of the inspection image with the reference image for each of the evaluation target regions.

4. The image inspecting apparatus according to claim 3, wherein the print alignment result evaluator evaluates an occurrence of misalignment of the inspection image with the reference image when the dispersion amount of the difference calculated in at least one of the evaluation target regions exceeds a specified threshold value.

5. The image inspecting apparatus according to claim 3, wherein the print alignment result evaluator changes a specified threshold value for each of the evaluation target regions depending on an edge amount included in the evaluation target region.

6. The image inspecting apparatus according to claim 2, wherein the evaluation region setup portion changes a size of the evaluation region depending on a distortion of the printout image that varies with a type of the recording material.

7. The image inspecting apparatus according to claim 1, wherein, when the amount of the difference dispersion exceeds a specified threshold value, the print alignment result evaluator evaluates an occurrence of misalignment of the inspection image with the reference image.

8. The image inspecting apparatus according to claim 1, wherein, when the abnormality detector does not detect an abnormality included in the inspection image, the print alignment result evaluator does not evaluate the print position alignment result.

9. The image inspecting apparatus according to claim 1, wherein the print alignment portion aligns a print position of the inspection image with a print position of the reference image, the inspection image being generated by reading a plurality of the recording materials including the same printout image formed based on a document image input to the image forming apparatus.

10. A non-transitory computer-readable recording medium storing a program causing a computer to perform:
reading an image formed by an image forming apparatus on a recording material and generating an inspection image;
aligning a print position of the inspection image with a print position of a reference image used as a reference for a good-item inspection on the image formed on the recording material;
detecting an abnormality in the inspection image based on a difference between the reference image and the inspection image after print positions are aligned; and
evaluating a print position alignment result from aligning a print position of the reference image with a print position of the inspection image including determining whether an abnormality exists based on dispersion of the difference included in an evaluation region around an edge calculated from a printout image included in the reference image, the difference being calculated from the inspection image;
wherein the evaluation region is distant from the edge of the printout image of the reference image by more than a specified quantity, a region that is distant from the edge within the specified quantity not used to evaluate the printout position alignment.

11. An image processing apparatus comprising:
a print alignment portion that aligns a print position of a reference image used as a reference for a good-item inspection on an image formed on a recording material with a print position of an inspection image generated by reading an image formed by an image forming apparatus on a recording material;
an abnormality detector that detects an abnormality in the inspection image based on a difference between the reference image and the inspection image after print positions are aligned; and
a print alignment result evaluator that evaluates a print position alignment result from aligning a print position of the reference image with a print position of the inspection image, the print alignment result evaluator determines whether an abnormality exists based on dispersion of the difference included in an evaluation region around an edge calculated from a printout image included in the reference image, the difference being calculated from the inspection image;
wherein the evaluation region is distant from the edge of the printout image of the reference image by more than a specified quantity, a region that is distant from the edge within the specified quantity not used to evaluate the printout position alignment.

12. An image forming apparatus comprising:
an image forming portion that forms an image on a recording material;
a reader that reads the image formed on the recording material and generates an inspection image;
a print alignment portion that aligns a print position of the inspection image with a print position of a reference image used as a reference for a good-item inspection on the image formed on the recording material;
an abnormality detector that detects an abnormality in the inspection image based on a difference between the reference image and the inspection image after print positions are aligned; and
a print alignment result evaluator that evaluates a print position alignment result from aligning a print position of the reference image with a print position of the inspection image, the print alignment result evaluator determines whether an abnormality exists based on dispersion of the difference included in an evaluation region around an edge calculated from a printout image included in the reference image, the difference being calculated from the inspection image;
wherein the evaluation region is distant from the edge of the printout image of the reference image by more than a specified quantity, a region that is distant from the edge within the specified quantity not used to evaluate the printout position alignment.

\* \* \* \* \*